W. WALSH, Jr.
ATTACHMENT FOR VEHICLES.
APPLICATION FILED JAN. 25, 1913.
1,064,797. Patented June 17, 1913.
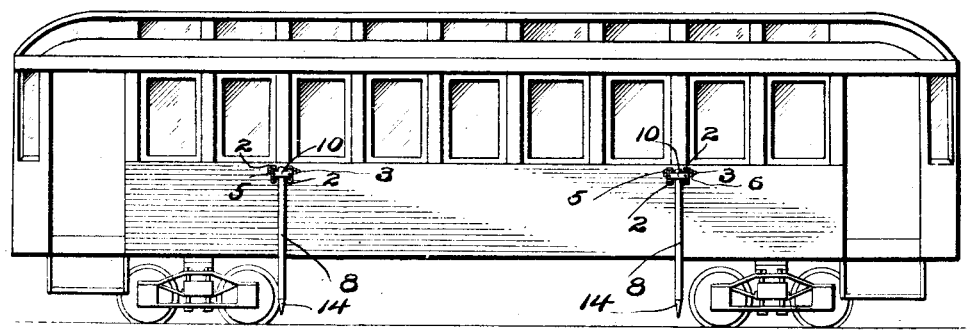
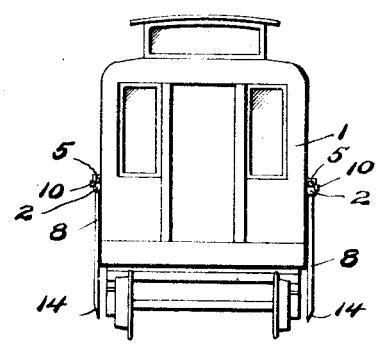
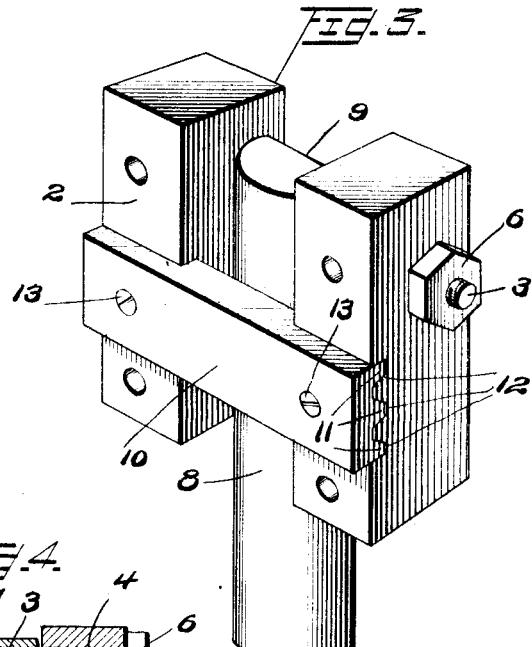
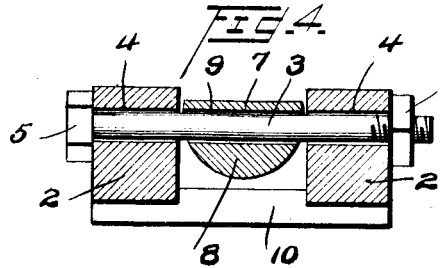
Inventor
William Walsh, Jr.
Witnesses
By Joshua R. H. Potts
Attorney

UNITED STATES PATENT OFFICE.

WILLIAM WALSH, JR., OF AVOCA, PENNSYLVANIA.

ATTACHMENT FOR VEHICLES.

1,064,797. Specification of Letters Patent. Patented June 17, 1913.

Application filed January 25, 1913. Serial No. 744,081.

*To all whom it may concern:*

Be it known that I, WILLIAM WALSH, Jr., a citizen of the United States, residing at Avoca, in the county of Luzerne and State of Pennsylvania, have invented certain new and useful Improvements in Attachments for Vehicles, of which the following is a specification.

My invention relates to improvements in attachments for vehicles, the object of the invention being to provide an attachment for cars, locomotives, automobiles or other vehicles which will prevent the same from toppling or falling over and will move by gravity into position to form a supporting prop for the vehicle in the event the latter falls sidewise.

A great many persons are injured in railroad and other wrecks by reason of the fact that the vehicle whether it be the locomotive, car, or road vehicle topples over and the occupants are either crushed or injured by the fall. When my improved attachments are in position on the vehicle, or rather on the body of the vehicle at both sides, if the body tilts to either side, the attachments will maintain a vertical or approximate vertical, and will engage the ground acting as props or braces to hold the body against falling completely over, thus obviating injuries which would otherwise occur.

A further object is to provide an improved attachment of this character which may be manufactured and sold at a reasonably low price, and which may be attached to any ordinary vehicle without altering the latter.

With these and other objects in view, the invention consists in certain novel features of construction and combinations and arrangements of parts as will be more fully hereinafter described and pointed out in the claims.

In the accompanying drawings: Figure 1 is a view in side elevation of a car illustrating my improved attachment in position. Fig. 2 is an end view of the car shown in Fig. 1. Fig. 3 is a perspective view of the upper end of my improved attachment showing the prop broken away, and Fig. 4 is a view in section through the upper end attachment taken in line with the pivot bolt.

1 represents a car to the opposite sides of which my improved attachments are secured. While I have shown two attachments at each side, I would have it understood that I am not limited to any particular number, and also that while my improvements are illustrated in connection with a car, they are adapted for use in connection with a locomotive, automobile, or any other vehicle.

All the attachments are precisely alike and hence the description of one will apply alike to all. Each attachment comprises parallel blocks 2, 2, which are adapted to be secured to the vehicle body in any approved manner. These blocks are connected by a pivot bolt 3 which extends through alined openings 4 in blocks near their upper ends, and said bolt at one end is provided with a head 5 and at its other end with a nut 6 to clamp the same in position. The bolt 3 projects through an opening 7 in a prop 8, the opening 7 being located near the upper end of the prop. The prop 8 in cross section is preferably of semi-cylindrical form, so that it has a flat face 9 located adjacent the side of the vehicle body, yet spaced therefrom sufficiently to allow the prop to pivot within certain limits. This pivotal movement of the prop is controlled by a cross bar 10 which on its inner face, at its ends, is provided with a plurality of teeth 11 which fit in recesses 12 in the blocks 2 and are secured in said recesses by screws 13. It will be noted that the cross bar 10 is in a plane below the bolt 3, so that when the prop swings outwardly, it will contact with the bar, and when acting as a support for the tilted car body, this bar 10 will sustain its proportion of strain and will effectually hold the body against further tilting movement. The lower end of the prop is sharpened as shown at 14, so that when the body tilts, this sharpened lower end will stick into the ground and prevent slipping. Ordinarily, the vehicle body when in upright position maintains the props 6 against the sides of the body, so that they do not project from the body any appreciable distance, but when the body tilts over, the props swing outwardly and engage the ground, holding the body from tilting all the way over, and performing such a function automatically.

My improvements may be attached to any vehicle, and as above stated, I do not limit myself to the particular vehicle nor to the particular details of construction set forth, but consider myself at liberty to make such changes and alterations as fairly fall within the spirit and scope of the appended claims.

Having thus described my invention, what I claim as new and desire to secure by Letters Patent is:

1. An attachment for vehicles comprising a pair of blocks, a bolt connecting the blocks and a prop pivotally supported on the bolt and freely swinging thereupon, substantially as described.

2. An attachment for vehicles comprising a pair of blocks, means rigidly connecting the blocks, a freely swinging prop, and a bolt connecting said prop to the support, substantially as described.

3. An attachment for vehicles comprising two blocks, a bolt connecting the blocks, a prop pivotally supported on the bolt, and means limiting the pivotal movement of the prop, substantially as described.

4. An attachment for vehicles comprising parallel blocks, a prop pivoted between the blocks, and a cross bar secured to the blocks and limiting the pivotal movement of the prop, substantially as described.

5. An attachment for vehicles comprising parallel blocks, a prop pivoted between the blocks, a cross bar secured to the blocks and limiting the pivotal movement of the prop, and said cross bar on its inner face at its ends having teeth positioned in recesses in the blocks, substantially as described.

In testimony whereof I have signed my name to this specification in the presence of two subscribing witnesses.

WILLIAM WALSH, Jr.

Witnesses:
FRANK J. PARKS,
JOSEPH NICHOLAS.

Copies of this patent may be obtained for five cents each, by addressing the "Commissioner of Patents, Washington, D. C."